June 13, 1950      W. S. HENCKE ET AL      2,511,531
OBJECT FRAMING ATTACHMENT FOR CAMERAS
Filed May 12, 1947      2 Sheets-Sheet 1
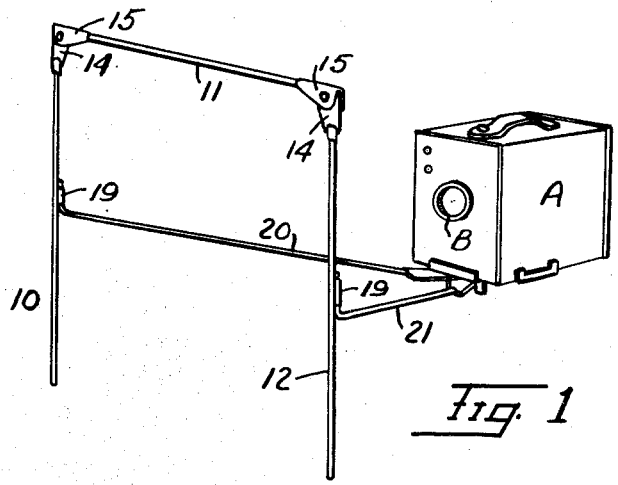
Fig. 1
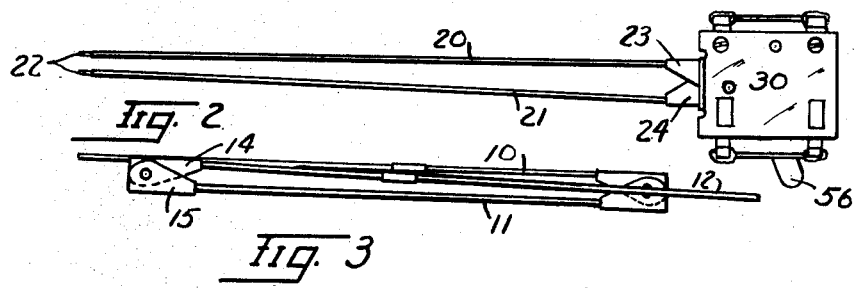
Fig. 2
Fig. 3
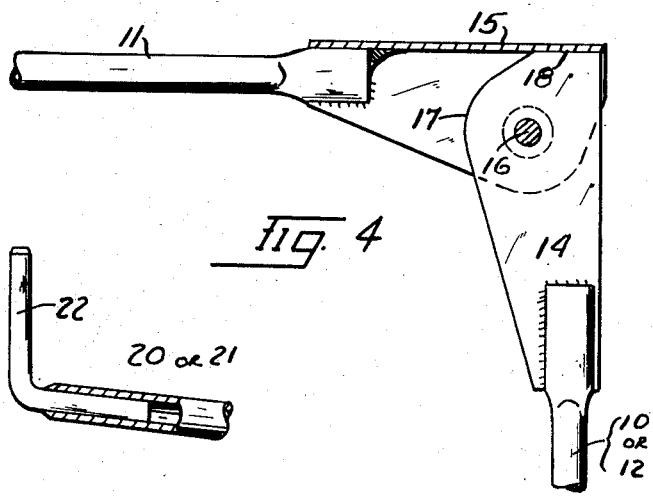
Fig. 4
Fig. 5
INVENTOR.
WILLIAM S. HENCKE and
CHARLES H. SAND
BY Bates, Peare & McBean
ATTORNEYS

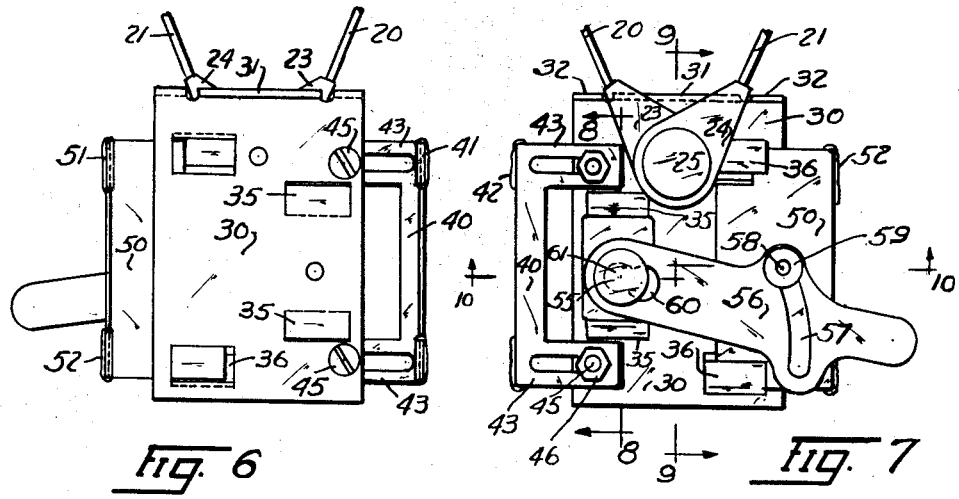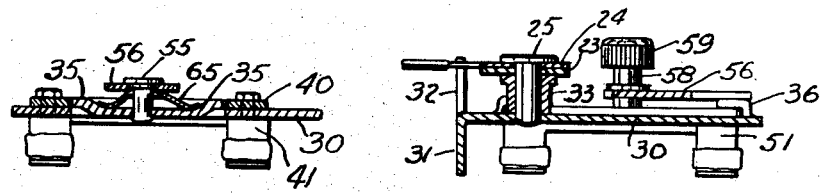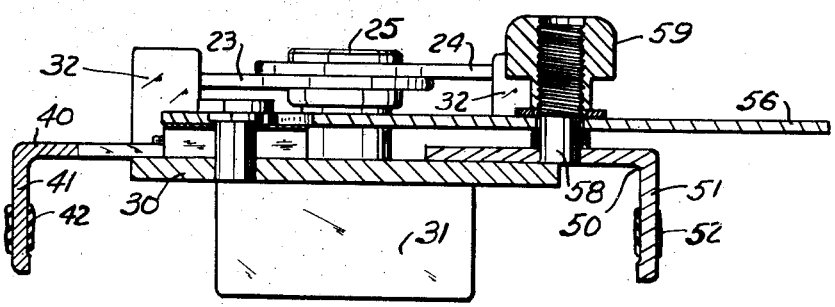

Patented June 13, 1950

2,511,531

UNITED STATES PATENT OFFICE 2,511,531

OBJECT FRAMING ATTACHMENT FOR CAMERAS

William S. Hencke and Charles H. Sand, Willoughby, Ohio

Application May 12, 1947, Serial No. 747,432

3 Claims. (Cl. 88—24)

This application is a continuation in part of our application Ser. No. 679,018, filed June 24, 1946, for an Object locating attachment for cameras, now Patent No. 2,466,171 of April 5, 1949.

This invention relates to an attachment for a hand camera enabling the accurate positioning of the object at the proper distance from the lens. By applying a special portrait lens to a hand camera it is possible to take portraits provided the object is at a very definite distance from the lens, usually about 13″. In taking portraits with such an equipped camera it has heretofore been very difficult to maintain the proper distance between the subject and the lens, and to accurately locate the image on the film. This is particularly true in taking portraits of young children, where the photographer must act quickly to obtain the desired attitude and expression.

Our copending application No. 679,018, abovementioned, shows, describes and claims a suitable folding frame adapted for attachment to a camera and serving to locate the subject at the proper distance from the portrait lens of the camera. The present application is for an improvement on the construction shown in such pending application, particularly in the provision for attachment to the camera. In the pending application we provide a folding open positioning frame supported by bars which are held to the camera by a screw extending into the usual threaded opening in the base of the camera for attachment to a tripod.

The improved construction of this application provides an adjustable clamp adapted to engage cameras of various sizes and properly locate and support the frame in front thereof. The primary object of the invention, therefore, is to provide the positioning frame with such a clamping device as may coact with cameras of various sizes to hold the frame in proper position, without relying on any threaded opening in the camera.

Our invention is illustrated in the drawings hereof and is hereinafter more fully described and its essential characteristics are set out in the claims.

In the drawings, Fig. 1 is a perspective of our locating frame attached to a camera by our improved clamping mechanism; Fig. 2 is a view of our clamp with the frame-supporting rods in a folded form; Fig. 3 is a view of the locating frame proper in folded condition; Fig. 4 is an enlarged view of two members of the frame at a corner thereof; Fig. 5 is a detail illustrating the connection of the supporting rod to the framing device; Fig. 6 is a plan of the clamping portion of our device; Fig. 7 is a bottom plan of the clamping portion; Figs. 8 and 9 are cross sections of such clamping portion in parallel planes, as indicated by the lines 8—8 and 9—9 on Fig. 7; Fig. 10 is an enlarged cross section in a plane at right angles to Figs. 8 or 9, as indicated by the line 10—10 on Fig. 7.

In Fig. 1 we have indicated at A a suitable camera carrying a portrait lens B, which may be an extra lens member mounted outside the regular lens. Our attachment comprises a locating frame, shown as composed of three bars 10, 11 and 12 hinged together; a pair of supporting rods 20 and 21 secured to the rods 10 and 12 of the locating frame and pivoted to each other at their opposite ends, and a clamping device for attaching such pivoted ends to the camera.

The locating frame is identical with that of our pending application and as there shown each of the arms 10 and 12 is provided at its upper end with a flattened extension 14, and the cross bar 11 is provided at each end with a doubled sheet metal extension 15 adapted to receive within itself the extension 14. These extensions are hinged together by pin 16. The extensions 14 readily may be sheet metal plates welded to the bar 10 or 12 while the extension 16 is a double sheet metal member welded to the bar 11.

The upper portion of the extension 14 is curved concentrically about the pivot 16 for a distance, as shown at 17, and then merges into a flattened edge 18 at right angles to the bar 10 or 12. The result is that the two bars 10 and 12 may be folded parallel with the bar 11 for storage purposes, as shown in Fig. 3, but when extended the flattened portion 18 of each vertical bar abutting the bent portion of the extension 15 of the cross bar 11 holds the vertical bars at right angles to the bar 11, as shown in Figs. 1 and 4.

Each of the bars 10 and 12 is provided in an intermediate region with a hollow sleeve 19 which may be secured thereto by welding. The supporting bars 20 and 21 have upturned ends 22 adapted to occupy these sleeves. As shown in Fig. 5 these supporting bars are tubular and there are short rods bent substantially at right angles entering the tubular portion and welded thereto to provide the upright extensions 22. When these extensions occupy the sleeves the two supporting bars are firmly atached to the open frame provided by the rods 10, 11 and 12.

The supporting rods 20 and 21 are flattened at their rear ends, as shown at 23 and 24 and overlap each other and are connected together by a pivot bolt, as in the construction of our pending application. However, instead of such pivot bolt (here designated 25) carrying a screw thread and adapted to enter the threaded bushing in the camera base, as in the prior construction, the pivot bolt is now secured to the clamp which engages the side walls of the camera and which will now be described with reference to Figs. 1, 2 and 6 to 10 inclusive.

The body of the clamp comprises a plate 30 adapted to engage the bottom of the camera and having a flange 31 at one end adapted to engage the front wall of the camera. On the front edge of this plate are also a pair of downwardly extending spaced lugs 32 adapted to engage the outer edges of the supporting rod portions 23 and 24 when they are spread by engagement of the forward ends of the rods with the locating frame. This plate has a downwardly extending hollow boss 33 in which is mounted the pivot stud 25 pivotally attaching the overlapped ends 23 and 24 of the supporting rods 20 and 21. It is convenient to mount the stud 25 tightly in the boss 33 and journal the ends 23 and 24 on the projecting portion of the stud beneath the boss, the stud having an overhanging head at its lower end.

To clamp the plate 30 to cameras of various sizes we provide two clamping plates 40 and 50 which are slidably mounted on the underside of the plate 30 and have upstanding wings 41 and 51 to coact with opposite sides of the camera. Each of the wings is preferably embraced by a band of rubber or other yielding material indicated at 42 and 52 to prevent marring the camera.

The clamping plate 40 is adjustably clamped to the plate 30 so as to be rigid therewith when once set for a particular camera. To effect this we have shown this plate as having a pair of slotted arms 43 which lie along the underside of the plate 30 and are guided by lips 35 bent downwardly from the plate. Through these arms there extend bolts 45 carrying clamping nuts 46. The heads of the bolts are countersunk in the plate 30 and provided with screw-driver slots. The clamping plate 40 may thus be adjusted in and out with reference to the edge of the plate 30 and rigidly clamped in position.

The opposed clamping plate 50 is likewise laterally adjustable on the plate 30, but lever means is provided for moving the plate in or out when it is desired to effect the clamping or to free the device.

As best shown in Fig. 7, the clamping plate 50 is slidably mounted on the underside of the supporting plate 30 by means of downwardly offset partially severed tongues 36 of the latter which provide a guideway for the sliding plate 50. Extending downwardly from the opposite portion of the plate 30 is a stud 55 on which is journaled a hand lever 56. This lever has an arcuate slot 57 extending eccentrically about the pivot 55. Passing through this slot is a pin 58 secured to and depending from the plate 50, and carrying a knurled nut 59 on the underside of the plate.

When the nut 59 is loosened the lever 56 may be manually shifted about its pivot (by a handle portion which extends beyond the plate 50) with the result that the edge of the eccentric slot 57 acting on the stud 58 shifts the plate in or out. Accordingly when the plate 40 has been properly set according to the width of the camera to be clamped, and the plate 50 has been shifted to an outer position, by the lever 56, the clamp is put in position with side arms of the plates at opposite sides of the camera, and with the front flange 31 engaging the front of the camera, then the lever 56 is swung in the closing direction until the camera is effectively grasped between the pads 42 and 52 on the respective plates. Then the nut 59 is turned into position to clamp the lever 56 in the set position, thus effectively locking the whole attachment to the camera.

It may be desirable to provide for a greater range of a movement of the plate 50 then can be effected by the eccentric slot 57. To accomplish this we provide two or more openings in the lever where it pivots about the pin 55. We have shown two of these openings designated 60 and 61 in Fig. 7, the openings being connected by a restricted passage. The portion of the pin 55 which the lever normally engages is cylindrical to occupy either opening 60 or 61 closely and form a good journal for the lever. Below this portion, however, the pin is flattened in the general direction of the length of the lever so that when the lever is registering with the flattened portion it may be moved longitudinally of the lever to position the other opening 60 or 61 about the pin.

A crowned leaf spring 65 surrounding the pin 55 and bearing against the underside of the plate 30 between the lips 35 tends to maintain the lever on the cylindrical portion of the pin 55. In Fig. 7, we have shown the lever 56 with its opening 61 about the pin and the lever cannot shift longitudinally from this position so long as the spring holds its opening about the cylindrical portion of the pin. In this position the clamping plate 50 may be moved by the lever to its outermost position.

For use with a camera of less width than can be well effected than when the lever is mounted in the opening 61 it is only necessary for the operator to press the intermediate portion of the lever toward the plate 30, compressing the spring and carrying the lever into registration with the reduced neck of the pin, whereupon the lever can be readily shoved onto position where the opening 60 embraces the pin. After this, the lever operates the clamp 50 within a range of movement suitable for a narrower camera.

When the clamping plate 40 is spread to the maximum, as shown in Fig. 7, and the lever 56 is pivoted by its outermost opening 61, the clamp may be spread to accommodate a camera of considerable width. On the other hand, with the clamping plate 40 shoved inwardly to its inward position and the operating lever 56 mounted by its opening 60, the two clamping walls may be brought close to the edges of the supporting plate 30 to clamp a camera not much wider than such plate.

As heretofore stated, the flange 31 on the front of the plate is placed in engagement in the front of the camera when the clamp is to be attached and the engagement of this plate from the two side plates 41 and 51 tightly locks the clamp to the camera. When the two supporting bars 20 and 21 pivoted to the plate 30 are spread and passed into engagement with the upright bars of the open frame, as shown in Fig. 1, the outer edges of the flattened portions of these bars adjacent their pivot abut the downturned lugs 32 on the plate 30 which are positioned to contact with the bars when thus spread.

The flattened ends 23, 24 of the supporting rods 20 and 21 prevent the rods twisting; the upright tubular connections of the supporting rods to the frame rods 10 and 12 prevent any twisting at their junctions, and accordingly the supporting rods hold the frame in the rectangular form shown in Fig. 1. At the same time the downward lugs 32 engaging the outer edges of the flattened ends prevent swinging of the supporting rods. Accordingly, the rectangular locating frame, though composed of three rods hinged together, is rigidly held in rectangular formation at the proper distance in front of the lens and accurately centered therewith. The operator may, therefore, readily carry the camera with the frame positioned in front thereof to the object to be photographed.

It should be noted that the supporting rods diverge from the clamp at a greater angle than the photographing angle of the lens and that hence the frame is outside of the region photographed and does not appear on the negative. The operator, by an almost instantaneous movement merely places the frame about the object, with the vertical frame rods approximately equally spaced on opposite sides of the object and the top rod above the object, and pushes the button or lever on the camera for making the exposure. Our device not only insures proper distance from the lens to the subject, which is very important when operating with a portrait lens at short range, but also acts as a finder for properly directing the camera to center the image on the film.

When the operator wishes to remove the device and store it he merely loosens the nut 59; throws the lever 56 to detach the device from the camera; pulls the supporting rod ends from their sockets on the open frame; swings the rods together, and folds the two end rods of the frame onto the central rod, so that the entire device is in the condition shown in Figs. 2 and 3. In that condition it may be readily mounted in a compact case of a length only that of the supporting rods and the clamp and of a width at the end opening sufficient to take the clamp.

We claim:

1. The combination of an open frame adapted to locate an object, a clamp adapted to engage a camera and a pair of supporting rods between the clamp and opposite sides of the frame, said clamp comprising a plate adapted to underlie the camera and having an upwardly projecting flange to engage the front of the camera, a pair of laterally movable members mounted on the plate and having upwardly projecting portions adapted to engage the opposite side walls of the camera, a lever pivotally mounted on the plate and having an arcuate eccentric slot through it and a stud on one of the clamping plates extending through said slot and carrying a nut adapted to clamp the lever in set position.

2. The combination of an open frame, a clamp to engage a camera, supporting means between the clamp and frame, said clamp having a movable clamping member to engage the camera and a lever for operating the clamping member, a pin carried by the clamp forming a pivot for the lever, the lever having a plurality of connected openings any one of which may form a journal for the lever on the pin, the pin having a journalling portion for the lever and a portion of reduced cross section, and a spring tending to keep the lever positioned on the journalling portion of the pin while allowing it to move into registration with the reduced portion whereby it may be shifted to bring another of said connected openings into registration with the pin.

3. In an object locating attachment of a camera, the combination of an open frame comprising a top bar and two side bars, a clamp, a pair of diverging supporting rods pivoted to the clamp and adapted to be connected to the side bars of the frame, said clamp comprising a plate adapted to underlie the camera having a positioning upstanding flange at the forward end and two downward lugs at the forward end to engage opposite sides of said rods, two clamping members carried by the plate, each having portions guided on the underside of the plate and portions extending upwardly to engage opposite sides of the camera, means for clamping one of said clamping members in adjusted position on the plate, a lever pivoted to the plate having an eccentric camming connection with the other clamping member, means for locking the lever in set position, the pivoting of the lever to the plate being by means of a pin carried by the plate extending through any of a plurality of connected openings in the lever, the connection between the openings being restricted to prevent normal longitudinal shifting of the lever from one opening to another, said pin having a portion of reduced cross section to enable such shifting, and a spring between the lever and plate normally maintaining the lever in one axial position on the pin while allowing it to be moved into another axial position whereby it may be shifted longitudinally of itself to change the journaling opening the pin occupies.

WILLIAM S. HENCKE.
CHARLES H. SAND.

REFERENCES CITED

The following references are of record in the file of this patent:

UNITED STATES PATENTS

| Number | Name | Date |
|---|---|---|
| 1,892,846 | Mueller | Jan. 3, 1933 |
| 2,112,449 | Proudfit | Mar. 29, 1938 |
| 2,277,448 | Munsinger | Mar. 24, 1942 |
| 2,351,386 | Zucker | June 13, 1944 |